Jan. 10, 1939. P. R. GUIRL ET AL Re. 20,974
METAL WORKING APPARATUS
Original Filed Nov. 24, 1933 10 Sheets-Sheet 1
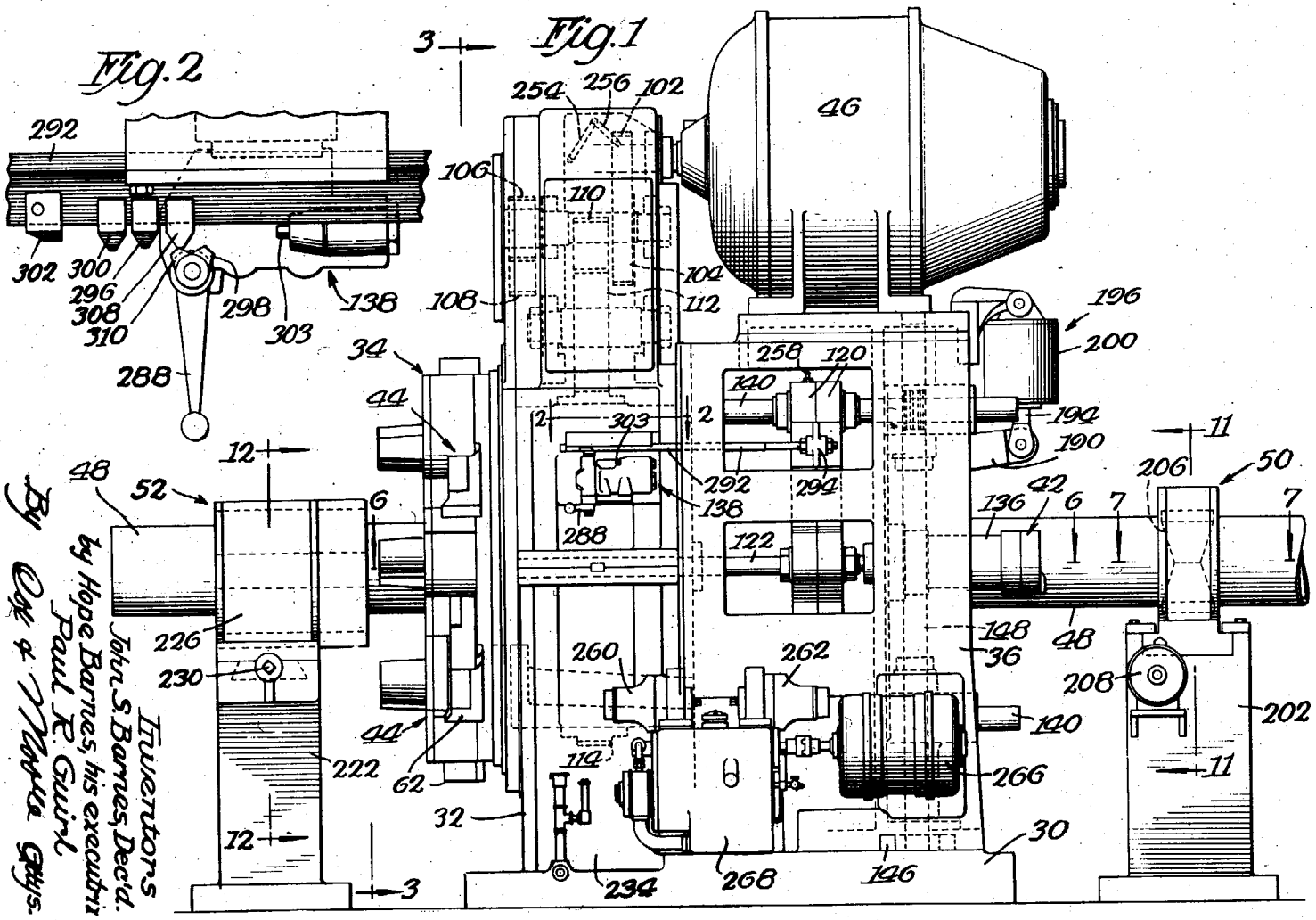
Inventors
John S. Barnes, Dec'd.
by Hope Barnes, his executrix
Paul R. Guirl
By Cox & Moore Attys.

METAL WORKING APPARATUS
Original Filed Nov. 24, 1933 10 Sheets-Sheet 2
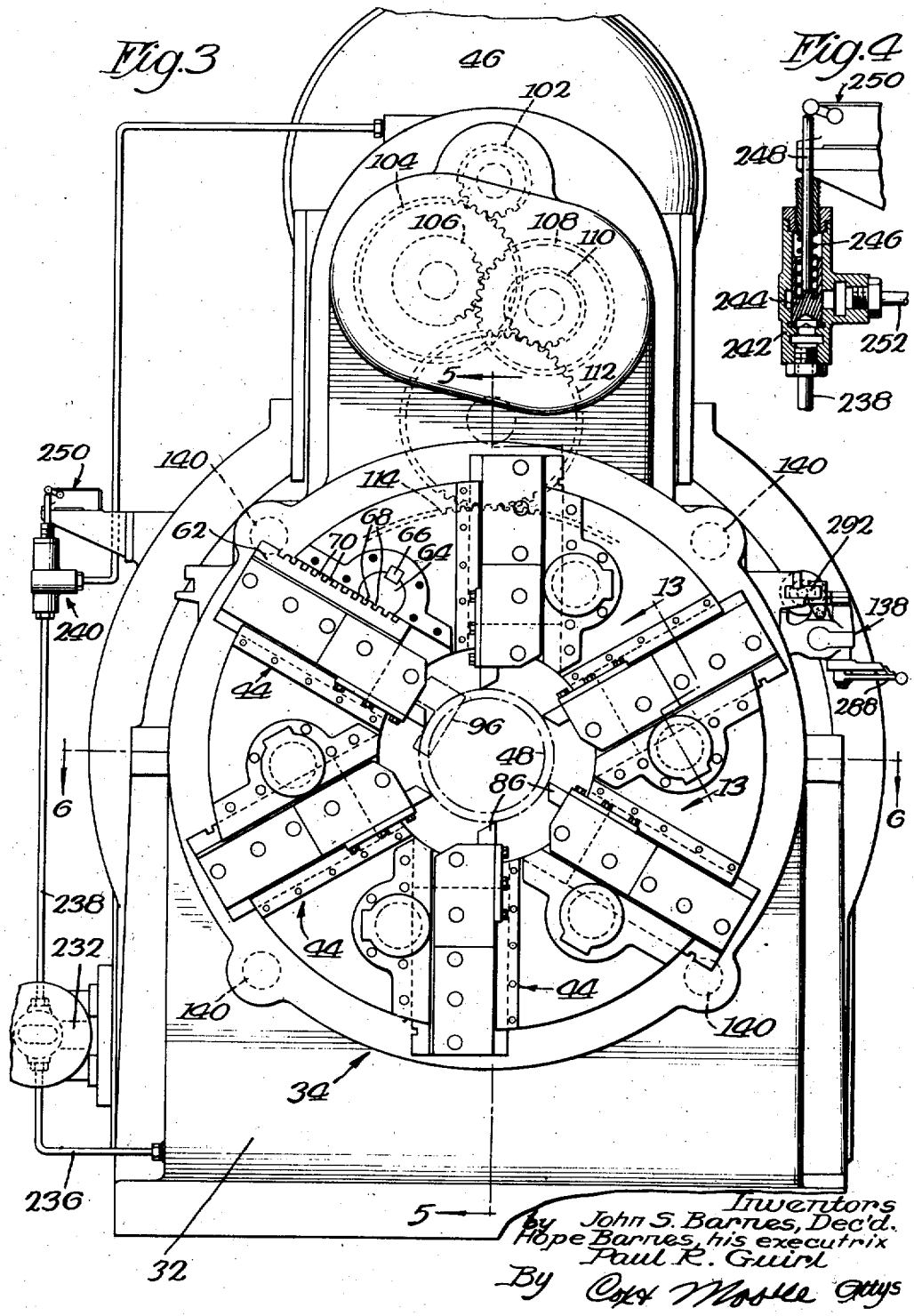
Inventors
By John S. Barnes, Dec'd.
Hope Barnes, his executrix
Paul R. Guirl
By Cook & Mosser Attys Jan. 10, 1939. P. R. GUIRL ET AL Re. 20,974

METAL WORKING APPARATUS

Original Filed Nov. 24, 1933 10 Sheets-Sheet 3

Inventors:
John S. Barnes, Dec'd.
by Hope Barnes, his executrix
Paul R. Guirl
By Cox & Moore Attys.

Jan. 10, 1939. P. R. GUIRL ET AL Re. 20,974
METAL WORKING APPARATUS
Original Filed Nov. 24, 1933 10 Sheets-Sheet 4
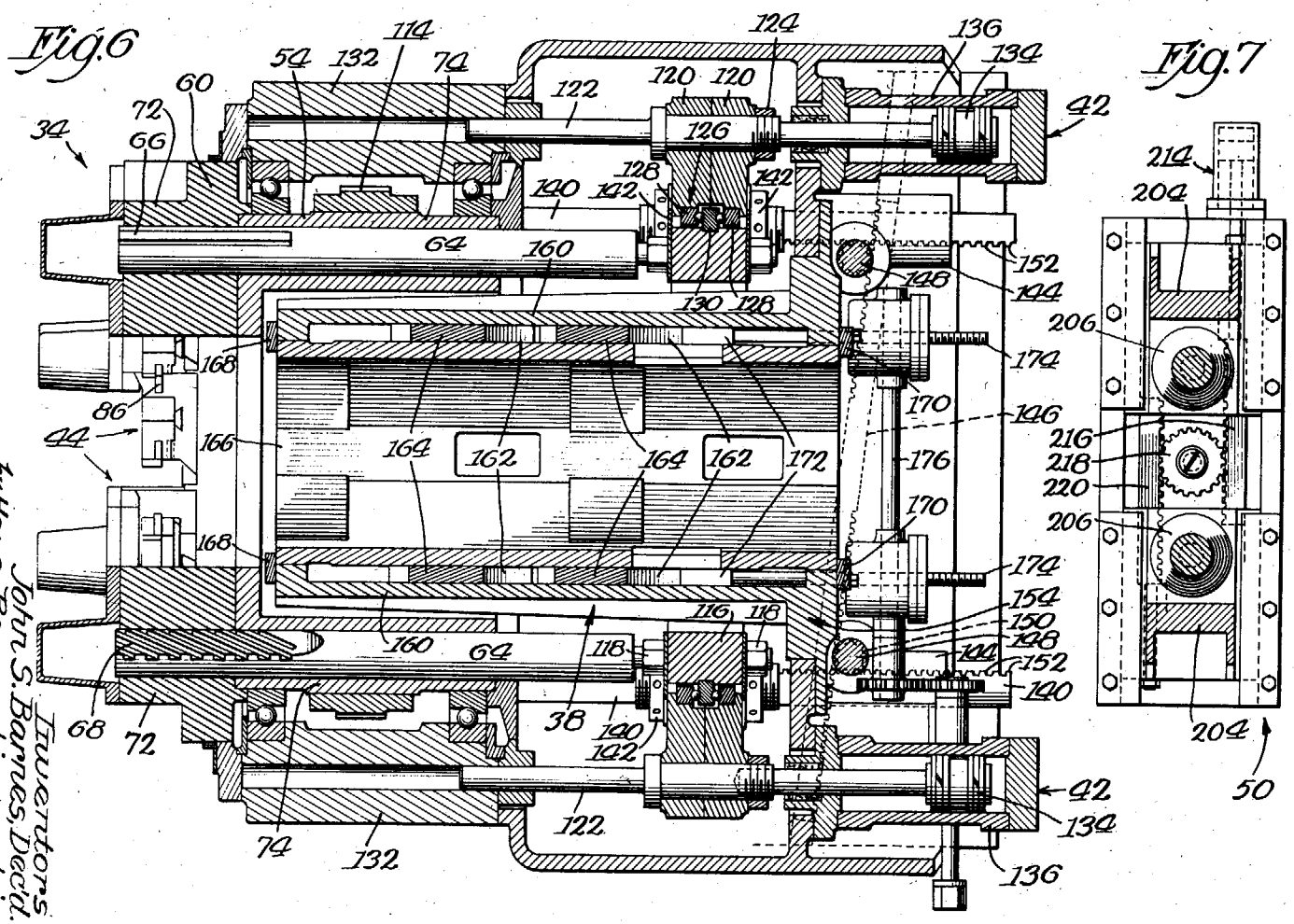
Inventors
John S. Barnes, Dec'd.
by Hope Barnes, his executrix
Paul R. Guirl
By Cox & Moore Attys.

Jan. 10, 1939. P. R. GUIRL ET AL Re. 20,974

METAL WORKING APPARATUS

Original Filed Nov. 24, 1933 10 Sheets-Sheet 5

Inventors:
John S. Barnes, Dec'd.
by Hope Barnes, his executrix
Paul R. Guirl
By Cox & Moore Attys.

Jan. 10, 1939. P. R. GUIRL ET AL Re. 20,974

METAL WORKING APPARATUS

Original Filed Nov. 24, 1933 10 Sheets-Sheet 6

Inventors:
by John S. Barnes, Dec'd.
Hope Barnes, his executrix
Paul R. Guirl
By Cox & Moore Attys.

METAL WORKING APPARATUS

Original Filed Nov. 24, 1933 10 Sheets-Sheet 7

Inventors
John S. Barnes, Dec'd.
by Hope Barnes, his executrix
Paul R. Guirl
By Cole & Mosle Attys

METAL WORKING APPARATUS

Original Filed Nov. 24, 1933 10 Sheets-Sheet 8

Inventors
John S. Barnes, Dec'd.
by Hope Barnes, his executrix
Paul R. Guirl
By Osborn & Marks Attys.

Jan. 10, 1939. P. R. GUIRL ET AL Re. 20,974

METAL WORKING APPARATUS

Original Filed Nov. 24, 1933 10 Sheets-Sheet 9

Inventors
John S. Barnes, Dec'd, by
Hope Barnes, his executrix
Paul R. Guirl
By Cox & Moore Attys.

Jan. 10, 1939.
P. R. GUIRL ET AL
Re. 20,974
METAL WORKING APPARATUS
Original Filed Nov. 24, 1933 10 Sheets-Sheet 10
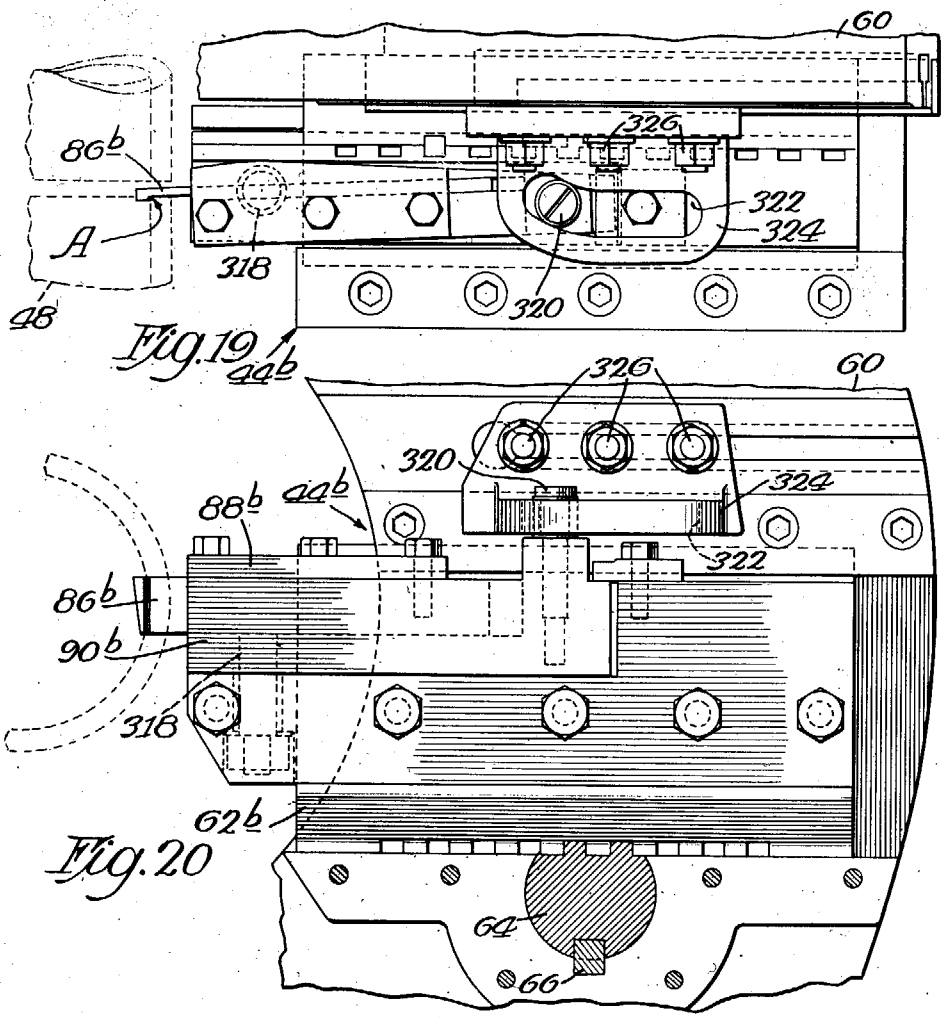
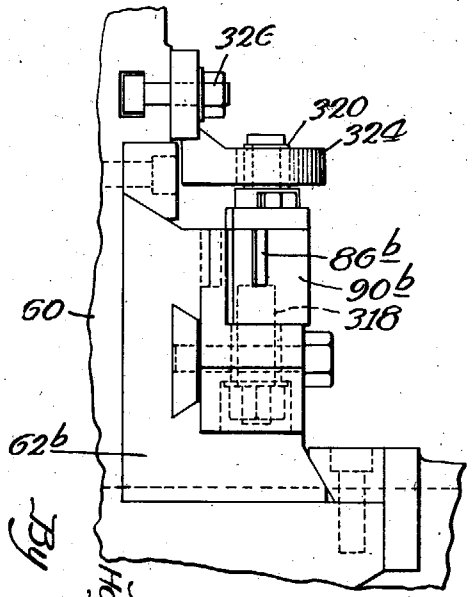
Fig. 21
Inventors:
John S. Barnes, Dec'd by
Hope Barnes, his executrix
Paul R. Guirl
By Cox & Moore Attys Reissued Jan. 10, 1939 Re. 20,974

UNITED STATES PATENT OFFICE 20,974

METAL WORKING APPARATUS

Paul R. Guirl, Rockford, Ill., and John S. Barnes, deceased, late of Rockford, Ill., by W. F. & John Barnes Company, Rockford, Ill., assignee Original No. 2,030,562, dated February 11, 1936, Serial No. 699,548, November 24, 1933. Application for reissue February 10, 1938, Serial No. 189,904

28 Claims. (Cl. 82—20)

This invention relates generally to metal working apparatus, and more particularly to apparatus for cutting tubes or pipes.

During the past few years large quantities of oil and gas from the fields of production have been transported over an extensive system of pipe lines. The consumption of natural gas in homes, factories, and the like has been a stimulating influence in leading to the adoption of pipe lines as an effective means of conveyance. The pipes or conduits used for such purposes are unusually large, and consequently very heavy. As a result, the steel industry has found it necessary to devise new methods and design new machinery to adequately, economically, and quickly supply the present demand. The present invention has a very practical application in the field of pipe or conduit production, and particularly in the production of exceptionally large and heavy tubing. Due to the weight and bulk of the tubing, it has been impracticable to employ cut-off machines of the type wherein the work is rotated and a cutting tool is held stationary. Tubing of the type mentioned above is not always produced in absolutely straight lengths, and hence difficulty arises in mounting such tubing in a rotary work support or chuck. It will be apparent that if a length of tubing is not straight, and one end thereof is mounted in a rotary chuck for the purpose of cutting off a section of the tubing, the free end will, during rotation, experience a decided whipping action. It is, therefore, one of the important objects of the present invention to provide a machine wherein the above mentioned and other difficulties are completely overcome, and whereby piping or tubing may be machined, cut off, chamfered, and the like in a very economical and practical manner.

More specifically, the invention contemplates a machine wherein the tubing is accurately clamped in position against rotation, and a plurality of rotary cutters are employed to perform the required machining operation.

Still more specifically, the invention contemplates a machine wherein the rotary cutters are adapted to shift in a radial direction toward and away from a rigidly supported work piece or tube, and this arrangement is combined with an efficient control mechanism for automatically governing the movement of the tools.

Another object of the invention is to provide a practical and efficiently operable work holder or support which is easily adjustable to accommodate various sizes of tubing, said support being so arranged as to obviate the necessity of disassembling or changing any of the machine parts to accommodate various sizes of tubes.

Still another object of the invention is to provide in a machine of the type set forth above, means for controlling the speed of radial movement of the tools in such a manner that said tools may be shifted at various speeds, depending upon the nature of the work to be performed.

A further object of the invention is to provide in combination with the rotary cutting mechanism set forth above, hydraulic actuators for effecting reciprocation of tool slides together with valve means for governing the length of stroke of said slides.

Still another object of the invention is to provide a machine tool of the type mentioned above, wherein the tool slides are radially reciprocable and adapted to rotate about the axis of a supported work piece or pipe, said work piece being supported and clamped in position and power means being provided to shift the work piece into position to be acted upon by the tools, another mechanism being provided for receiving and holding the severed portion of the work piece.

A further object of the invention is to provide improved means for chamfering either the internal or external margin of a tube or conduit, this being accomplished by securing the work against rotation and moving a plurality of chamfering tools about the axis of the work piece.

In addition to the above mentioned objects and advantages, the present invention contemplates the provision of a safety feature to insure continued operation of the machine, and to this end a safety feature is incorporated whereby the driving motor for the machine automatically stops in the event that the pressure in the lubricating system drops to a predetermined point; in other words, when the lubricating system is not functioning properly, the machine cannot be started.

The foregoing and numerous other objects and advantages will be more apparent from the following detailed description when considered in connection with the accompanying drawings, wherein—

Figure 1 is a side elevational view of a machine which is representative of one embodiment of the invention;

Figure 2 is an enlarged fragmentary plan view of the control valve mechanism and dogs for timingly controlling the functioning of said valve mechanism;

Figure 3 is an end elevational view of the machine shown in Figure 1, said view being taken substantially along the line 3—3 of Figure 1;

Figure 4 is a fragmentary detail central sectional view of the valve mechanism which prevents the prime mover or motor from starting unless sufficient oil pressure for lubrication is established;

Figure 6 is a horizontal transverse sectional view of the machine taken substantially along the line 6—6 of Figure 3, the tubular work piece being removed in order to more clearly disclose parts otherwise hidden;

Figure 7 is an enlarged horizontal sectional view of the mechanism for moving a pipe or tube into position to be cut, said view being taken substantially along the line 7—7 of Figure 1;

Figure 19 is a plan view of a modified tool holding device arranged to support a tool designed for internal chamfering work;

Figure 20 is a front elevational view of the device shown in Figure 19; and

Figure 21 is an end view of the device shown in Figures 19 and 20, said view being taken from the left of said figures.

Figure 5:
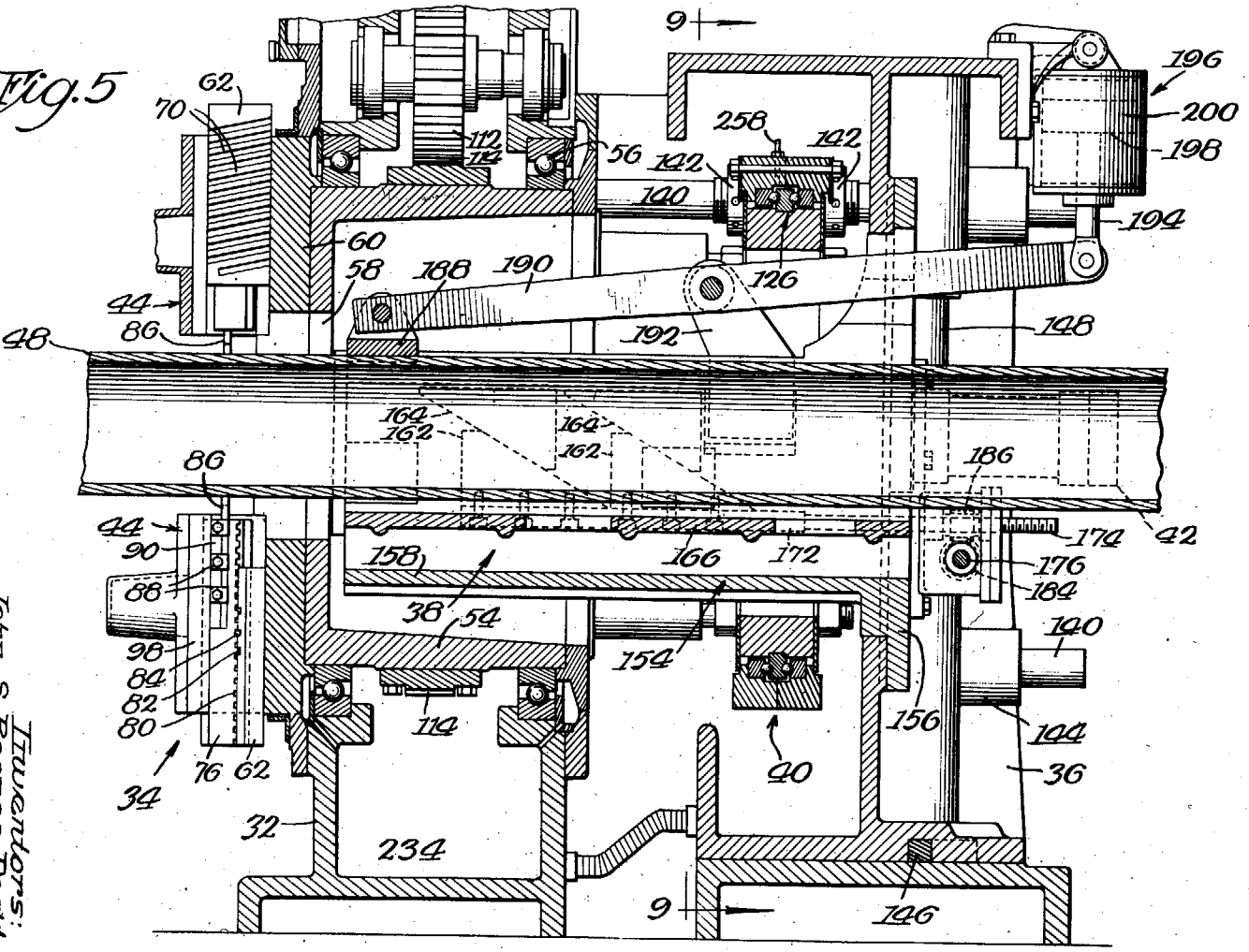
Figure 5 is a fragmentary vertical sectional view of the machine taken substantially along the line 5—5 of Figure 3, with a tubular work piece in position to be acted upon by the rotary tool cutting mechanism.

Referring now to the drawings more in detail wherein like numerals have been employed to designate similar parts throughout the various figures, it will be seen that a machine embodying features of the present invention includes a base 30. Extending upwardly from the left portion of the base 30 (Figures 1 and 5) is a frame or housing 32, which provides the main supporting structure for a rotary tool cutting mechanism designated generally by the numeral 34. Extending upwardly from the right side of the base 30 is a frame structure 36, which provides the main support for a work holding device designated generally by the numeral 38 (Figures 5 to 8, inclusive). The frame 36 also provides a mounting for a mechanism 40, which forms the driving coupling between hydraulic mechanisms 42 and radially shiftable tool holding devices 44, later to be described, said devices being radially slidable at the forward side of the rotary cutting mechanism 34. The frame 36 also provides the support for a prime mover or electric motor 46 which serves to impart rotary movement to the tool holding devices 44. A work piece such as a pipe 48 is moved into operative association with the rotary cutting mechanism 34 and the work supporting mechanism 38 through the agency of a mechanism 50 (Figures 1 and 11), and a mechanism 52 (Figures 1 and 12) serves as a support for the portion of the work projecting beyond the rotary cutting mechanism 34.

*Rotary cutting mechanism*

Reference having been made in a general way to the main operating structures of the machine, a detailed description of the rotary cutting mechanism 34 will now be given. This mechanism includes a rotary member or drum 54 supported by anti-friction bearings 56 carried by the frame 32 (Figure 5). The forward end of the driving drum 54 is apertured at 58 to receive the work piece 48 and also carries a mounting plate or disk 60, which plate is also apertured to receive the work. The tool holding devices 44, previously referred to, are supported upon the outer face of the mounting plate 60 as clearly indicated in Figures 3, 5, and 13. There are in all six tool holding devices radially disposed and equally spaced along the surface of the plate 60, and each of these devices 44 includes a slide 62 which is adapted to be radially reciprocated along the face of the plate 60 in response to longitudinal movement of a companion bar 64. This bar 64 is provided with a longitudinally key 66 to prevent the bar from rotating about its axis. The oppositely disposed surface of said bar is provided with teeth 68 which mesh with companion teeth 70 in the slide 62. These teeth are so disposed that when longitudinal movement is experienced by the bar, radial movement will be transmitted to the slide 62. It will be seen that the bar 64 is companion to each of the slides 62, and that these bars are slidable within bearings 72 formed on the plate 60 and bearing sections 74 provided along the periphery of the drum 54 (Figure 6). Each of the slides 62 carries a block 76 which is adapted to be adjustably secured upon the slide 62 by means of suitable bolts 78, which engage a gib 79 at their inner ends. It will be noted that the block 76 is provided with a plurality of grooves 80, and the slide 62 is provided with a plurality of similar grooves 82. In order to adjust the position of the block 76 upon the slide 62, it is only necessary to loosen the bolts 78, remove a key 84, and shift the block 76 until the desired complementary grooves are brought into registration. The key 84 is then reinserted and the bolts 78 tightened. A cutting tool proper 86 is adapted to be clamped in fixed position by means of suitable clamping members 88, which are carried by a block 90 secured in position by bolts 92.

Figure 13:
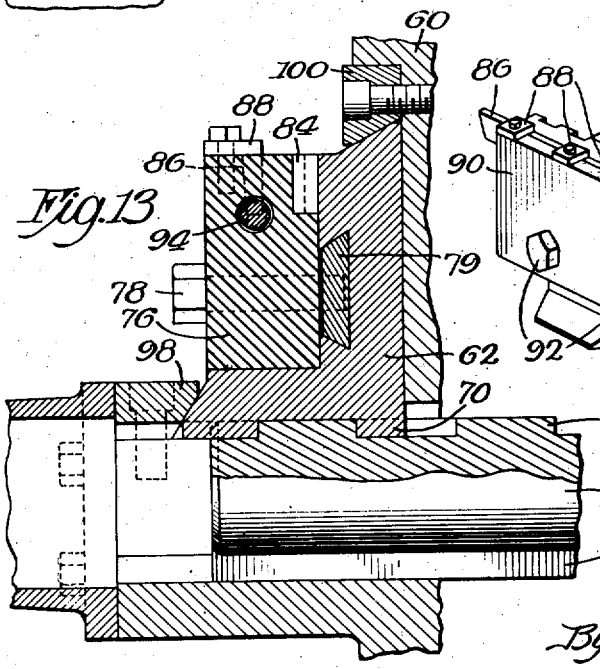
Figure 13 is an enlarged detail sectional view of one of the tool holding devices, said view being taken substantially along the line 13—13 of Figure 3.
Figure 14:
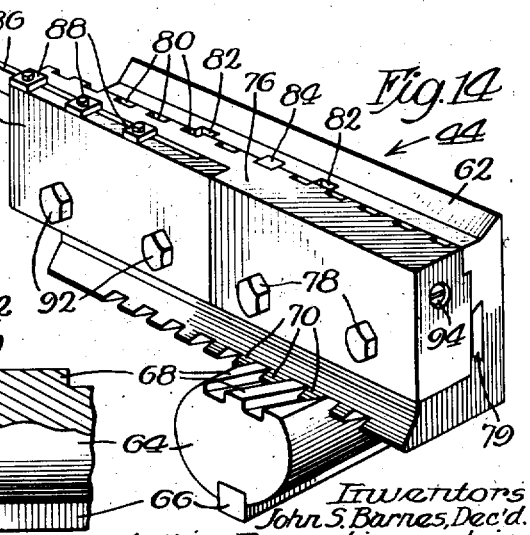
Figure 14 is a fragmentary enlarged perspective view of one of the tool holding slide structures shown in operative association with its companion actuating bar.

Attention is directed to the fact that adjustment of the tool 86 may be made by first loosening the clamping members 88 and then turning an adjusting screw 94 (Figures 13 and 14). After the tool has been adjusted to the desired position, which may be determined by the use of a suitable hand gauge 96 (indicated by dot-and-dash lines, Figure 3), the clamping members 88 may be tightened. It will also be noted that gibs 98 and 100 carried by the member 60 serve to accurately guide the slide 62 (see Fig. 13). Thus it will be apparent that when the bars 64 experience longitudinal movement to the right (Figures 5 and 6), the tool holding device 44 will be shifted inwardly so as to bring the tools 86 into operative association with the periphery of the work 48. By mechanism, later to be described, the initial inward movement of the tool holding devices is relatively rapid, and, as the cutting action of the tools begins, a slower feeding movement takes place. After the cutting has continued for a predetermined distance, the tools experience a slower feeding movement until the cutting operation is completed. After a slight dwell, the tools are then moved outwardly at a rapid rate. Obviously the machine is not in any sense limited to the specific cycle of operation mentioned above. In some instances it is desirable to employ only a rapid approach, feeding and rapid reverse without the variable feeding movement.

*Mechanism for rotating tools*

Figure 15:
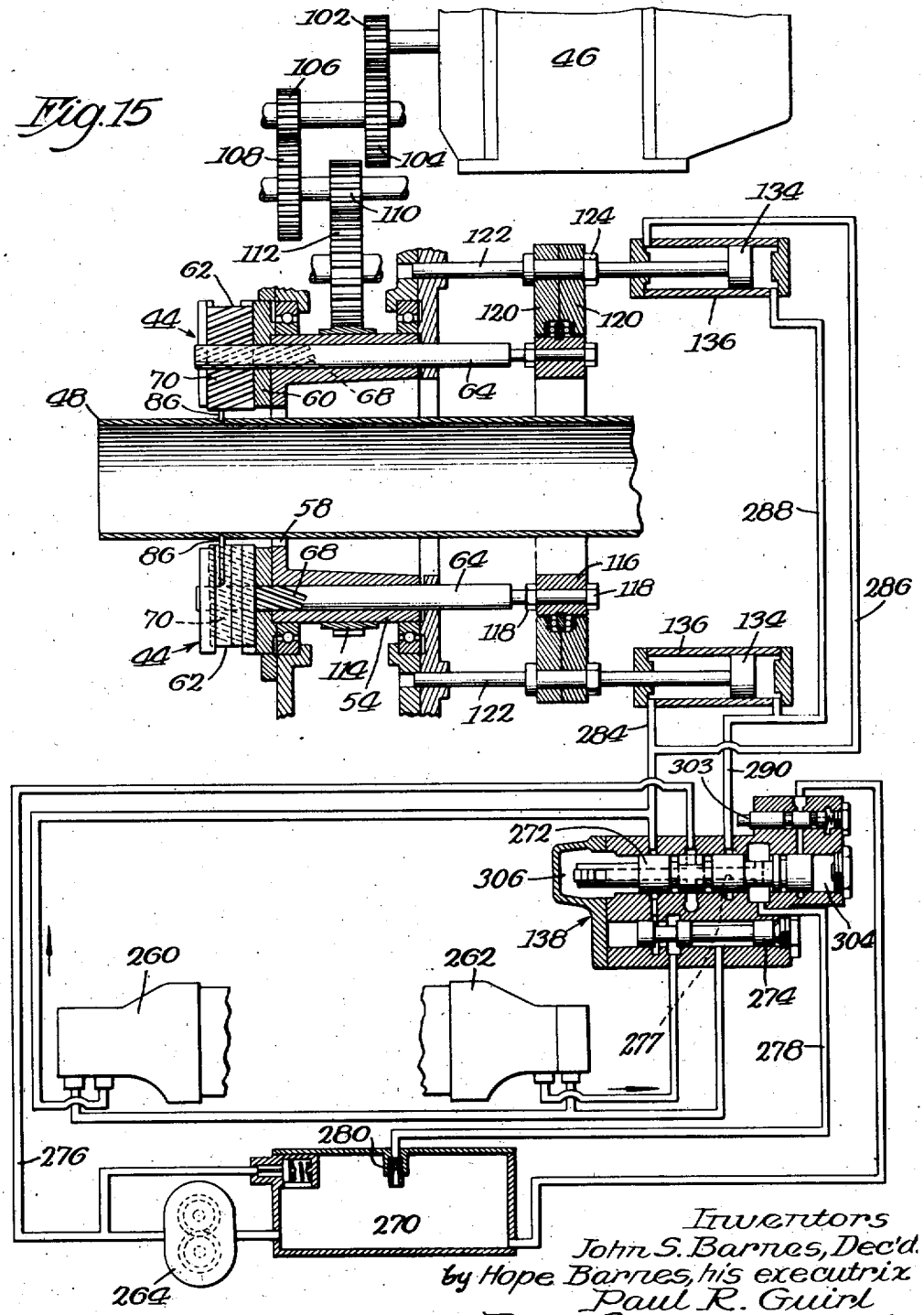
Figure 15 is a semi-diagrammatic disclosure of the hydraulic control and the mechanism for operating the rotary cutter mechanism.

The mechanism for imparting rotation to the tool driving drum 54 is driven through the agency of the prime mover or motor 46. This motor may be a single speed, multi-speed, or D. C. motor of suitable design. A gear 102 connected directly with the shaft of the motor 46 meshes with a gear 104 (Figures 1 and 15). The gear 104 transmits power to a pair of pick-off gears 106 and 108. The size of the pick-off gears will obviously be determined by the speed at which tools are desired to be rotated. The pick-off gear 108 is coupled with a smaller gear 110 which meshes with a gear 112. This gear 112 meshes with a large annular gear 114 mounted upon the periphery of the hollow tool supporting member or drum 54.

*Mechanism for radially shifting tool holders*

The mechanism for imparting longitudinal movement to the bars 64, and consequently radial movement to the tool holding devices 44, includes an annular member 116, which is connected with the ends of the bars 64 by means of suitable clamping nuts 118. This member 116 forms a unitary coupling for the inner ends of the bar 64 and is freely rotatable within a pair of symmetrical stationary members 120. These members 120, at diametrically opposite points, are coupled with piston rods 122 (Figures 6 and 15). Each of the piston rods 122 is threaded to receive a clamping nut 124 which serves to clamp the members 120 to the piston rod. Positioned within the members 120 is an anti-friction bearing structure 126. This structure 126 includes a pair of outer annular race members 128 (Figure 6), which cooperate with a central race member 130 to secure ball bearings therebetween. By this construction, the annular member 116 is free to float within the members 120, and, in response to longitudinal movement of the piston rods 122, radial movement will be transmitted to the tool holding devices 44 through the agency of the annular member 116 and the bars 64 coupled therewith. One extremity of these piston rods 102 is slidably supported within bearings 132 mounted upon the outer surface of the upright frame section 32. The opposite extremity of each piston rod 122 connects with a piston 134 reciprocable within a cylinder 136, and the movement of the piston within said cylinder is controlled by a valve mechanism 138, later to be described. It will suffice to say at this point that the position of the valve mechanism governs the speed and direction of travel of the pistons 134.

In order to rigidly support the annular members 120 in proper position within the frame structure, four guide bars 140 are employed. These bars are threaded to receive clamping rings 142 which are designed to be firmly tightened against the outer surfaces of the annular members 120 by any suitable tightening means such as a spanner wrench (not shown). These clamping rings or collars 142 serve to securely clamp the members 120 together in a fixed position upon the bars 140. The inner extremities of the bars 140 are reciprocably mounted within the frame 32 and the outer extremities thereof are reciprocable within bearing sections 144 of the upright frame section 36. In this manner the rings or annular members 120 are accurately guided within the frame 36 when they are shifted by the hydraulic actuators 42.

Figure 10:
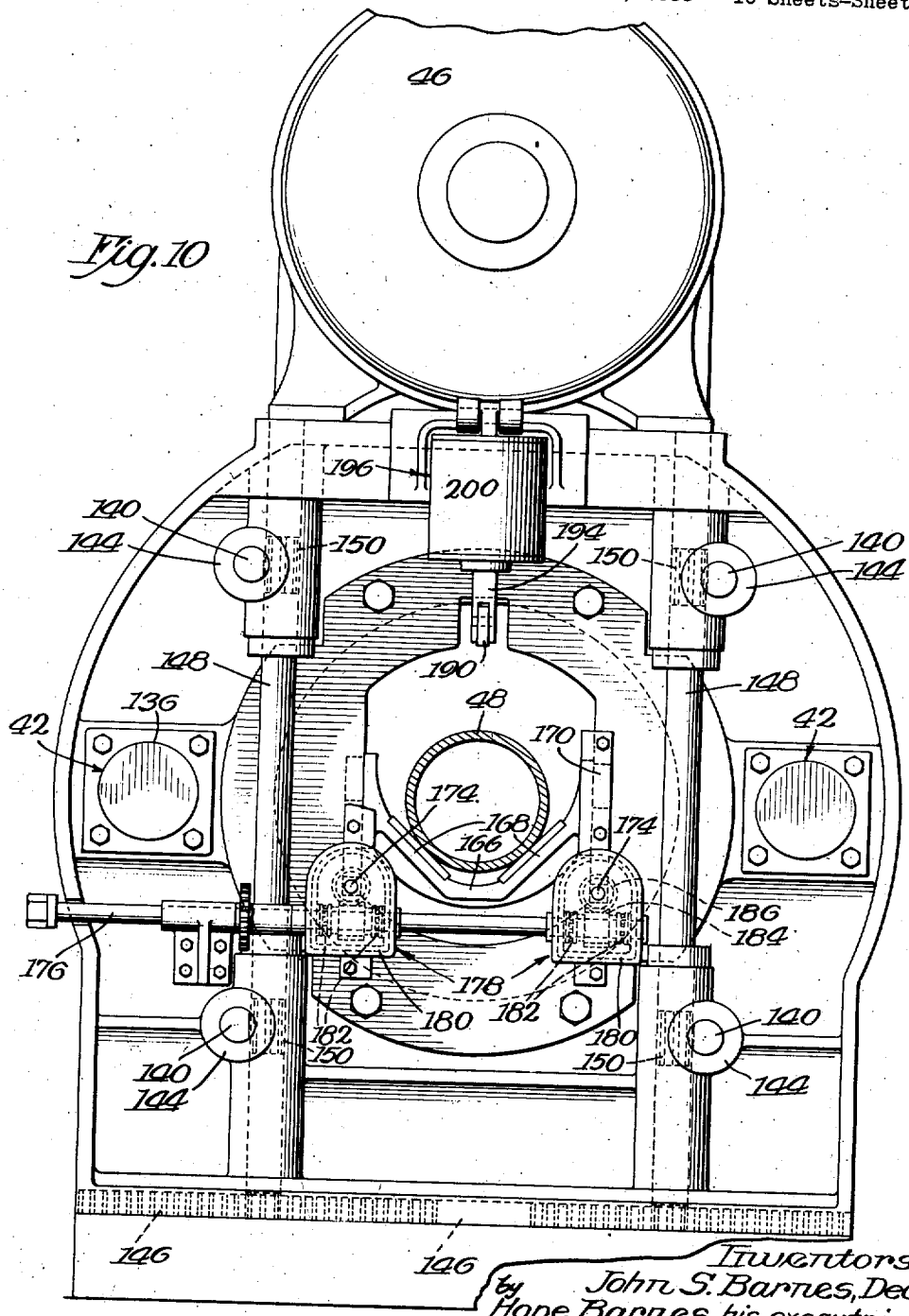
Figure 10 is an end view of the machine as seen from the right of Figure 1.

Attention is directed to a rack bar 146 which traverses the lower portion of the machine structure and meshes with vertical shafts 148, as clearly indicated in Figures 6 and 10. These shafts are provided with intermediate teeth 150, which mesh with companion rack teeth 152 provided on the bars 140. This rack bar arrangement serves as a compensator for the hydraulic actuators 42. It sometimes happens that one of the tools will start to cut in advance of the others due to the uneveness of the work piece 48, and this would have a tendency to impose an unbalancing action on the actuators and cause a strain which would tend to force the structure out of alignment. The above mentioned rack and pinion construction serves as an equalizing means which precludes the introduction of such strains.

*Work carrier*

Figure 8:
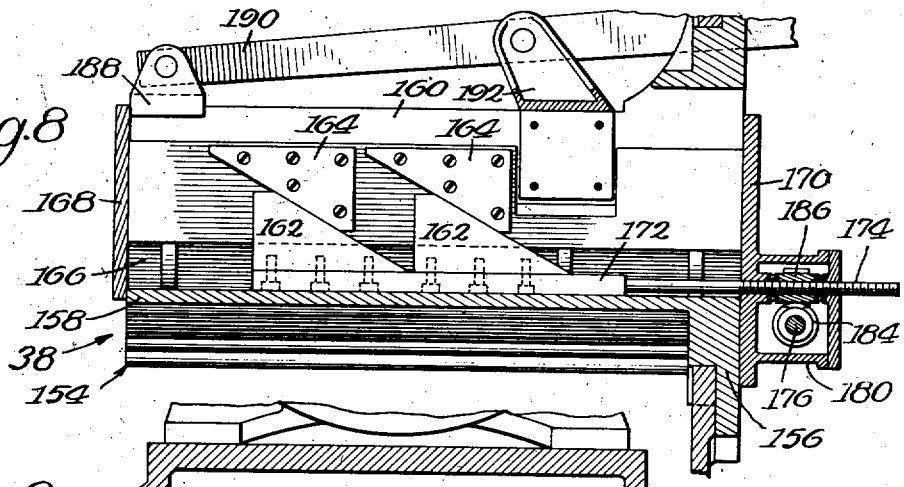
Figure 8 is a fragmentary detail sectional view of the mechanism for adjustably supporting the work or pipe, said view being taken substantially along the line 8—8 of Figure 9.
Figure 9:
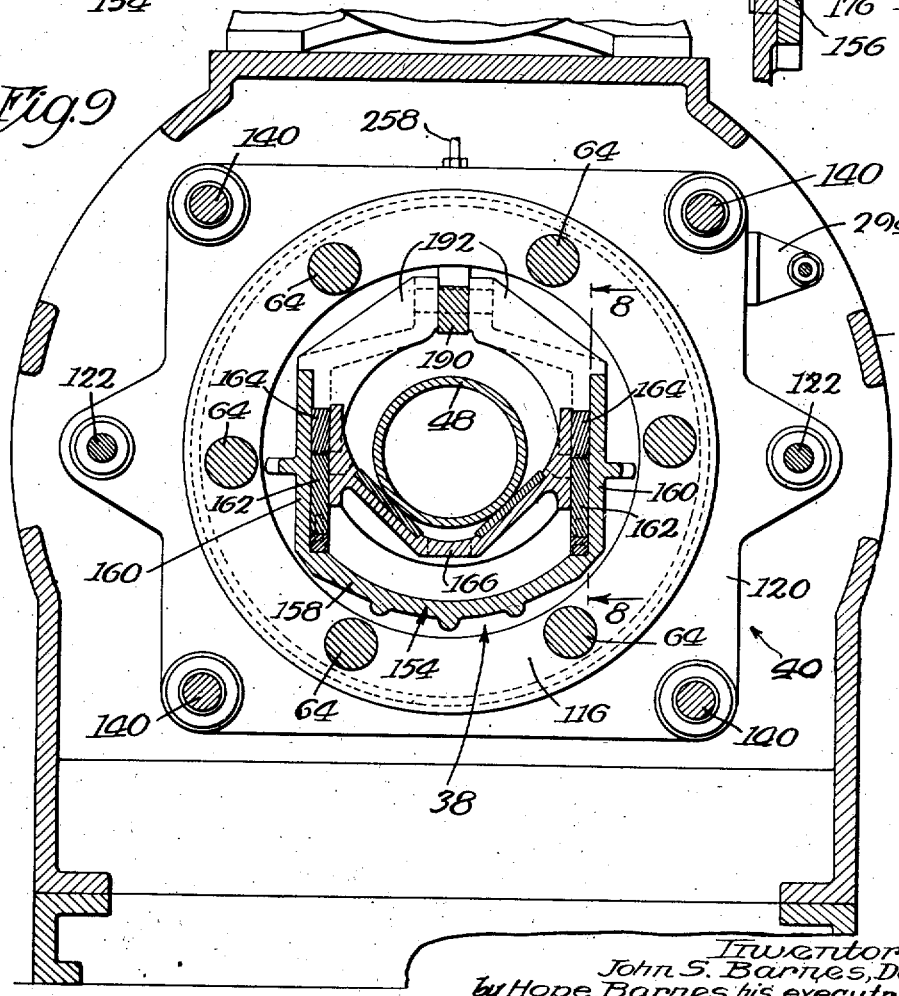
Figure 9 is a vertical transverse sectional view of the machine taken substantially along the line 9—9 of Figure 5.

Attention is now directed to the manner in which the work piece 48 is supported by the carrier mechanism 38 and is secured against rotation within the machine during the cutting operation. This carrier mechanism includes a hollow bracket or frame 154. This frame 154 includes a flanged section 156, which is positively secured to the frame section 36 (see Figures 5 and 6) and an inwardly projecting section 158. This inwardly projecting section 158 comprises a lower arched portion having vertical side sections or walls 160 formed integral therewith and extending upwardly therefrom as clearly shown in Figures 8 and 9. Slidably mounted adjacent the inner surface of each of the walls 160 is a pair of cam members 162. These cam members support upper companion cam members 164 which are secured to the side sections of a work cradle 166. By referring to Figure 9, it will be apparent that the cradle 166 provides a rest or support for the lower surface of the work 48. Thus, the weight of the work piece 48 and the cradle 166 is carried by the cam members 162, which are, in turn, mounted upon the carrier 154. The cradle 166 is secured against longitudinal movement by an abutment plate 168 at one extremity and an abutment plate 170 at the opposite extremity (Figure 8).

The cam members 162 are secured to a bar 172 connected with a screw shaft 174. The screw shaft 174 can be shifted longitudinally by turning the outer squared end of a shaft 176 (Figures 8 and 10), which shaft is rotatable within suitable bearing structures 178. These bearing structures 178 include a housing 180 and a pair of antifriction thrust bearings 132, which are mounted within said housing. These thrust bearings 182 are positioned on opposite sides of a worm 184 or similar device which meshes with a worm wheel or gear 186. The gear 186 having a threaded mounting upon the shaft 174, will cause longitudinal movement of the bar 172 when rotation is imparted to the squared end of the shaft 176. In this manner the cradle or work holding device 166 may be raised or lowered to accommodate various sizes of tubes. By merely rotating the shaft 176 so as to cause the cam members 162 to shift to the right (Figure 8), the cradle 166 is elevated. This provides a very rigid and radially adjustable support for the work or tube 48.

*Work clamping device*

After the work piece has been positioned by the cradle 166, a clamping member 188 is urged downwardly against the upper surface of the work, as clearly indicated in Figure 5. This clamping member 188 is pivotally supported at one end of a lever 190. This lever 190 is pivotally supported upon a bracket 192, and the opposite extremity of the lever 190 is pivotally connected with a piston rod 194 of a fluid actuator 196. This fluid actuator may be of any conventional design, and may be either hydraulically actuated or air operated. It will suffice to say that when the piston 198 within the cylinder 200 of the actuator 196 is urged upwardly, the member 188 is firmly clamped against the upper surface of the work 48.

It will be apparent from the foregoing description that the cradle 166 and its associated parts cooperate with the clamping member 188 to provide a chucking mechanism, namely, a mechanism which properly centers the work with respect to the rotary tools 86. While the cradle does not function to clamp the work in place, it does supply the undersupport for the work when the member 188 is clamped against said work. Thus, the tubular work piece is firmly secured against rotation within the machine during the operative functioning of the tools 86.

*Work shifting mechanism*

Figure 11:
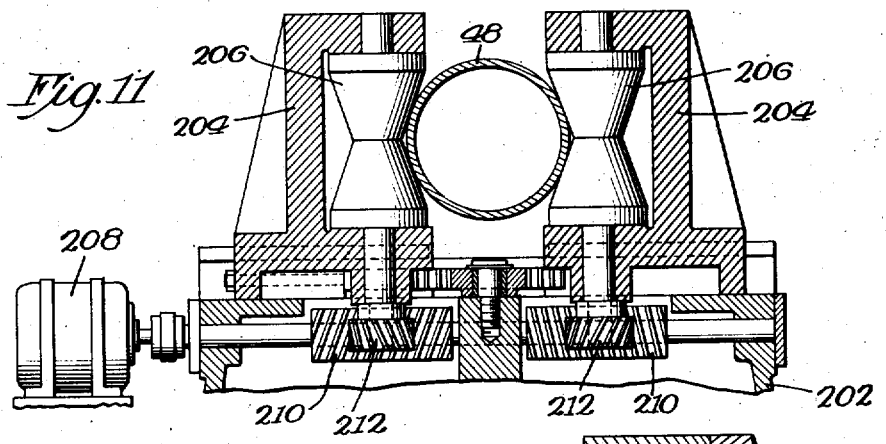
Figure 11 is a vertical sectional view of the mechanism for moving the pipe into position, said view being taken substantially along the line 11—11 of Figure 1.
Figure 12:
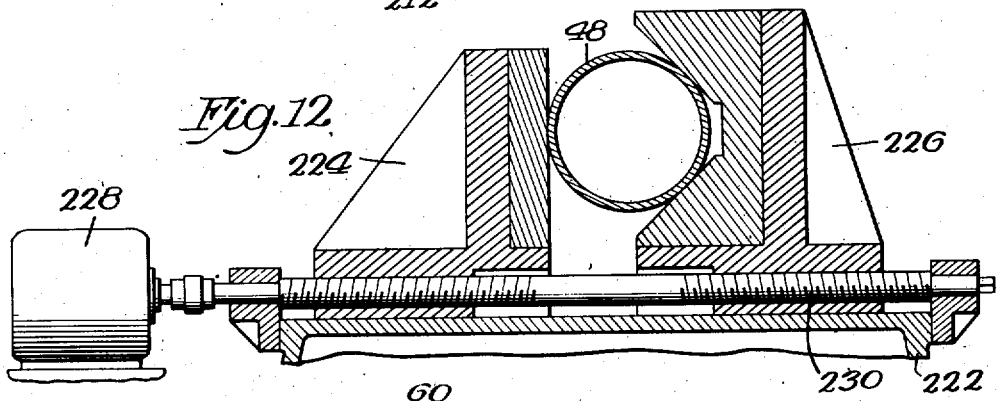
Figure 12 is an enlarged transverse sectional view of the mechanism for clamping the portion of the work extending beyond the rotary cutting mechanism, said view being taken substantially along the line 12—12 of Figure 1.

The work shifting mechanism 50 shown more clearly in Figures 1, 7, and 11, includes a suitable base 202, which carries at its upper end a pair of oppositely disposed symmetrical roller supports 204. Rollers 206 comprising oppositely disposed cone sections are adapted to frictionally engage the outer surface of the work 48, as clearly indicated in Figure 11. Rotation is imparted to these rollers 206 through the agency of a prime mover or electric motor 208, which functions through worms 210 meshing with worm wheels 212. The rollers 206 are preferably urged toward the work by means of an actuator 214 (Figure 7), which connects with a rack bar 216. This rack bar 216 meshes with an intermediate gear 218, which, in turn, meshes with a rack bar 220. The rack bar 216 is coupled with the support which carries one of the rollers, and the rack bar 220 is coupled with the support which carries the other roller. In this manner the rollers are continually urged into frictional engagement with the work. Obviously other forms of actuator devices for maintaining frictional contact may be employed, as well as other driving means for rotating the rollers, without departing from the spirit and scope of the present invention. The actuation of the motor 208 may be controlled so as to arrest the movement of the rollers when the work piece reaches the desired position within the machine. It will suffice for the present invention to state that any suitable conventional control device for governing the degree of travel of the work piece may be employed.

*Forward work support*

The mechanism 52 (Figures 1 and 12) includes an upright base or frame 222, which at its upper end carries a pair of slidable clamping members 224 and 226. These clamping members are urged toward each other through the agency of a suitable power mechanism or motor 228, which acts through a screw 230. Obviously various forms of clamping devices may be employed for securing the projecting extremity of the work in place. As previously stated, the work is very heavy and hence, after a part has been cut off, such part must be held in position so as to prevent it from falling and possibly injuring the operator or the machine. The device operates on the principle of a vise, and, in view of the heavy work carried thereby, it is frequently necessary to employ power means for urging the clamping members 224 and 226 together. Obviously the invention is not in any sense limited to any particular type of power mechanism, and contemplates hydraulic or pneumatic control in instances where such control is desired. It will also be noted that the support or clamping device 52 allows the work to be machined when they are not long enough to be clamped in the main clamping arrangement within the machine. It also permits the work to be machined at both ends without the necessity of turning the part around.

*Safety device*

Particular attention is directed to Figure 3 wherein a pump 232 is driven from any suitable source. This pump draws fluid from a reservoir 234 provided within the frame 32 (Figure 1) through a conduit 236. This fluid is directed through a conduit 238 into a valve mechanism 240. This valve mechanism includes a housing or casing 242 and a reciprocable valve member 244 within said housing, which is adapted when sufficient fluid pressure has been established within the conduit 238 to shift upwardly against a coiled spring 246. The upper end of the valve member 244 is connected with a valve stem 248, which, when moved upwardly, actuates a switch mechanism 250. When the valve stem 248 occupies its upper position, the switch mechanism 250 is conditioned to electrically connect the motor 46 with the source of power supply. However, when the fluid within the conduit 238 falls, the valve 44 lowers and the switch mechanism automatically operates to cut out the motor 46. A conduit 252 connects with various points which are to be lubricated, for example, with passages 254 and 256 (Figure 1), which connect with the gear train driven from the motor 46 and also with a conduit 258 (Figures 1 and 5), which communicates with the anti-friction bearing structure 126. It is of the utmost importance that these parts be continuously supplied with a lubricant, and should the pump 232 cease to supply the necessary lubricant pressure, the motor will automatically be cut out through the action of the switch mechanism 250. Obviously various forms of control mechanisms may be employed other than the specific arrangement disclosed herein. The switch mechanism 250 is commonly referred to in the trade as a pressure switch. It will suffice to say that the control mechanism must function to automatically cut out the motor when the lubricant pressure falls, and must also electrically condition the motor for starting in the event that the lubricant pressure reaches a predetermined point.

*Hydraulic control mechanism*

As previously stated, the valve mechanism 138 serves to control the speed and direction of movement of the actuator pistons 134, which cause the radial shifting of the tool holding devices 44. Referring to the circuit diagram in Figure 15, it will be seen that two feed pumps 260 and 262 are employed and also a rapid traverse pump 264. The valve mechanism is so constructed as to enable the simultaneous use of both feed pumps 260 and 262 when a relatively rapid inward feeding movement of the tools is required, and is also adapted to render the pump 262 functionally inoperative, thereby causing the pump 260 to propel said tools at a slower feeding rate. The rapid traverse pump 264 is employed to propel said tools at a rapid rate. These pumps are driven from any suitable source such as an electric motor 266 shown in Figure 1. The pumps are mounted upon a unitary frame 268, which houses a reservoir 270 shown diagrammatically in Figure 15. The valve mechanism 138 includes a main valve 272 and a feed control valve member 274. When the valve member 272 occupies its central or neutral position as shown in Figure 15, and the valve member 274 is shifted to the left from the position shown in said figure, fluid from the rapid traverse pump 264 passes through a conduit 276 and circulates through a passage 277 provided within the valve member 272 and back through a conduit 278 through a restricted orifice 280 into the reservoir 270. In other words, the rapid traverse pump merely circulates and does not serve to propel the actuator pistons 134 in either direction.

Assume now that the work piece has been properly positioned in the machine and that the motor 46 is operating to impart rotation to the rotary cutting mechanism 34. By shifting a control handle 282 of the valve mechanism 138 (Figure 2) to the right, the valve member 272 is urged to the left (Figure 15). In this position fluid from the rapid traverse pump 264 is delivered to the left end of the actuator cylinders 136 through conduits 284 and 286. Fluid from the right end of said cylinders passes outwardly through conduits 288 and 290 back through the valve mechanism 138 and into the return conduit 278. At this point attention is directed to a dog supporting slide 292 (Figures 1 and 2), which moves with the actuator pistons 134. One end of this slide 292 is coupled with the annular members 120 by a bracket 294, as clearly shown in Figure 1. The tools 96 are now being urged at a rapid rate inwardly toward the work piece 48 and the dog supporting slide 292 is moved to the right (Figures 1 and 2). Eventually a dog 296 engages a finger 298, which causes the valve member 272 to be returned to neutral. With the valve member 272 in this position and the feed control valve 274 in the position indicated in Figure 15, fluid from both of the feed pumps 260 and 262 is directed into the left ends of the cylinders 136. This feeding action occurs as the tools 86 engage the periphery of the work. This fast feeding movement of the tool continues until a dog 300 engages the finger 298 and causes the valve member 272 to be slightly urged to the right. The slight movement of the valve member 272 to the right causes the feed control valve member 274 to be shifted slightly to the left (Figure 15). In this position the member 274 causes the feed pump 262 to circulate at substantially no pressure, and the pump 260 then functions alone to propel the tools 86 inwardly at a slower feeding rate. As the cutting operation is completed, another dog 302 engages the outer end of a valve member 303, which, when urged to the right, permits fluid from a chamber 304 at the right end of the valve mechanism 138 to be released, thereby enabling the pressure of the normal balancing fluid within a chamber 306 to cause the valve member 272 to be suddenly shifted to the right. In this position fluid is delivered by the rapid traverse pump 264 in a reverse direction to the actuators 42. This causes the rapid or outward return movement of the tools to take place. Inasmuch as the specific construction of the valve mechanism 138 is not being claimed in the present application, but is being claimed in co-pending applications Serial No. 627,025 filed July 30, 1932 and Ser. No. 696,284 filed November 1, 1933, a detailed description thereof is not essential to a clear understanding of the present invention. It will suffice to say that the valve mechanism 138 is constructed and arranged so as to efficiently control the starting and stopping of the actuators 42, and also to control the rapid movement thereof, as well as the fast and slow feed thereof in the manner described above.

It will also be apparent that as the tools reach the limit of their outward movement, a dog 308 on the slide 298 engages a finger 310, thereby causing the valve member 272 to be automatically returned to neutral. In this position the rapid traverse pump, as well as the pumps 260 and 262, circulate without imparting movement to the actuators 42. In the present embodiment the pumps are disclosed as being driven from a separate motor 266, but obviously said pumps may be driven from a single prime mover in instances where such a construction is more suitable.

*Holder for external chamfering tool*

Figures 16, 17, 18:
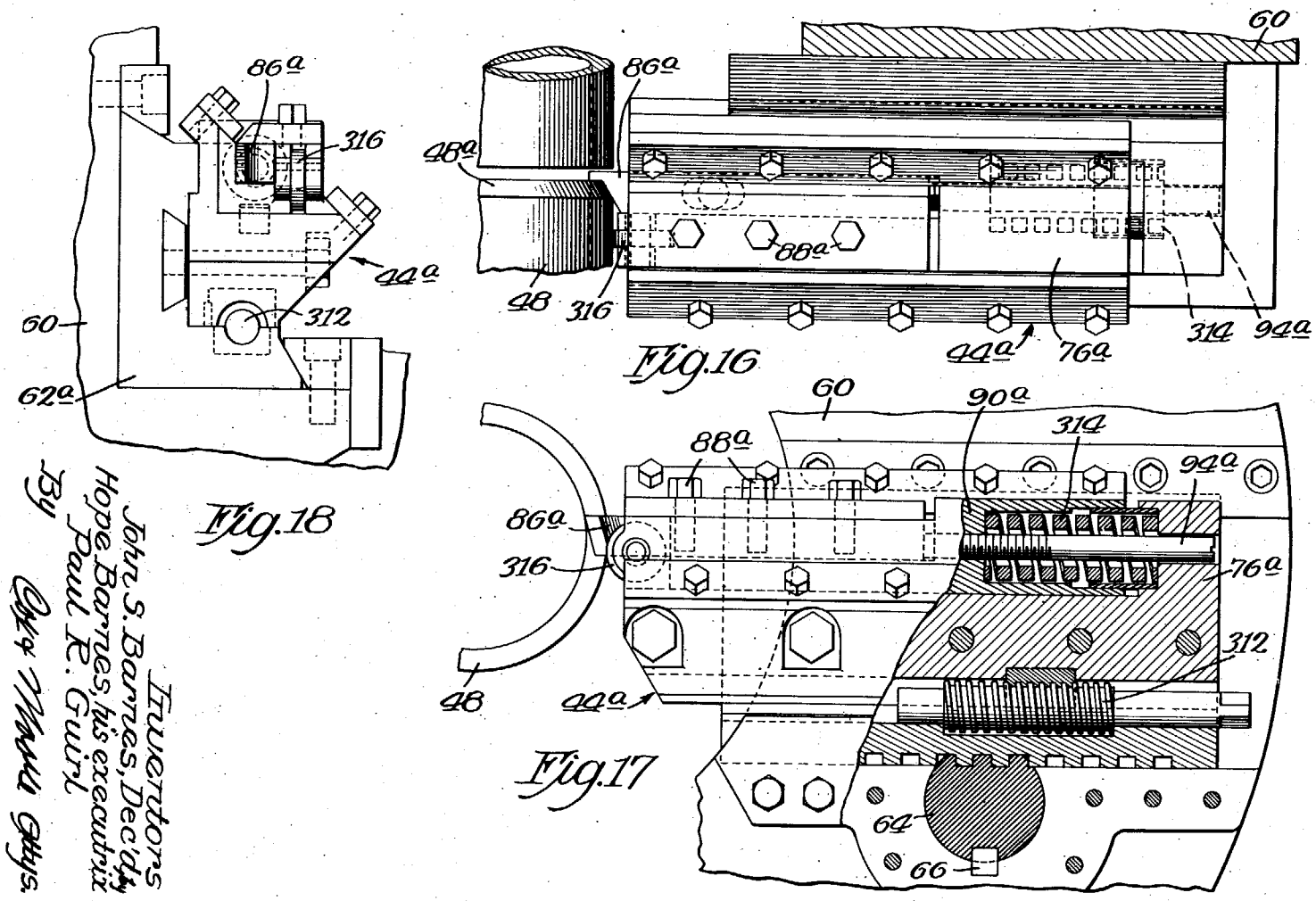
Figure 16 is an enlarged plan view of a modified tool holding device which is designed to support a chamfering tool.
Figure 17 is a front elevational view of the device shown in Figure 16.
Figure 18 is an end view of the device shown in Figures 16 and 17, said view being taken from the left of said figures.

In Figures 16 to 18, inclusive, a modified tool holding device is disclosed, which is particularly adapted for chamfering the work piece. This holder is designated generally by the numeral 44a, and is similar in many respects to the tool holder mechanism 44 previously described. The mechanism 44a includes a slide 62a, which is propelled and mounted in the same manner as the slide 62 previously described. An auxiliary slide or block 76a is mounted upon the slide 62a and is adapted to be shifted for purposes of adjustment with respect to the slide 62a by means of an adjusting screw 312. The block 76a also carries a chamfering tool 86a adapted to be adjustably secured in position by means of clamping members 88a and an adjusting screw 94a. The main difference in structural arrangement of the tool holder 44a and the holder 44 resides in the manner in which the tool 86a is yieldably urged to the left (Figures 16 and 18) through the action of a heavy coiled spring 314. Furthermore, a roller follower 316 is employed, which is adapted to bear against the periphery of the work piece 48, as clearly indicated in Figure 16. It will be noted that the tool 86a is particularly designed for forming an external chamfer 48a upon the work piece 48. A slide or block 90a corresponding with the block 90 previously described carries the tool proper and is slidably mounted within the block 76a. By having the roller 316 follow along the periphery of the tube, a uniform chamfer will be cut regardless of the fact that the tube may not be rotating on its true center. In other words, if the tube is not properly centralized by the chuck and the roller 316 is not present, a non-uniform chamfer is the result. However, when the tools 86a follow along the circumference of the tube by reason of the presence of the roller 316, the chamfer cut will be uniform with respect to the tube periphery.

*Holder for internal chamfering tool*

In Figures 19 to 21, inclusive, an internal chamfering tool 86b is disclosed. This tool is supported within a tool holder device indicated generally by the numeral 44b, which includes a main slide 62b carried by the plate 60. The slide 62b is shifted in the same manner as the slides 62 and 62a previously described. A block 90b in which the tool 86b is directly mounted, is pivoted at 318. Suitable clamping means 88b is employed to secure the tool 86b within the pivoted block 90b. The inner or free end of the block 90b carries a follower member 320, which is adapted to move within a slot 322 provided in a bracket 324. This bracket may be adjustably secured in a fixed position upon the member 60 by means of suitable clamping bolts 326. It will be noted that the slot 322 includes a straight portion and a slightly curved portion. Thus, as the slide 62 begins its initial inward movement, no lateral movement is transmitted to the tool 86b. As the follower member 320 reaches the curved portion of the slot 322, the inner end of the tool 86 will be positioned so as to perform an internal chamfering operation when said tool is urged toward the inner circumferential corner of the work, this corner being designated by the letter A in Figure 19. Movement of the follower member 320 within the curved portion of the slot causes the chamfering tool 86b to be shifted toward the corner A so as to perform the required internal chamfering action.

*Summary*

From the foregoing it will be apparent that the present invention contemplates a machine tool whereby unusually heavy and bulky tubes may be cut off, chamfered, and the like in a very practical manner. The described mechanism should be clearly differentiated from conventional cutting off machines wherein a rotary spindle is equipped with a chucking collet for receiving the work. In such machines the work is rotated and a tool moves toward the work. These conventional machines are not adapted to be used for performing the machining operations described herein. As previously pointed out, the weight and bulk of heavy tubing preclude the rotation thereof, unless a machine of tremendous size and strength is employed, the operation of which would require excessive power. That is to say, the power required to operate and maintain such a device would be prohibitive in this day of highly developed methods of machine production. By employing the machine disclosed herein, the power for operating same is relatively small for the reason that the work is held stationary and the cutters are rotated. In the present machine, all of the stresses which would otherwise result from the centrifugal, bending or whipping forces occasioned during the rotation of an elongated work piece, such as a tube, are completely eliminated The utilization of a plurality of cutters in the manner described herein, reduces the size of chip per tool, and at the same time causes the removal of a large amount of metal per unit of time. The hydraulic actuation of the cutting tools not only lends itself in this particular environment, but also presents a very desirable and safe feeding action which makes for increased rate of production. It will be apparent that the present invention contemplates a machine which is capable of machining very large, heavy tubes without the consumption of excessive power, and with a minimum amount of skill and effort on the part of an operator. While the machine is unusually rigid in design, it is not exceptionally large when one considers the heavy duty work it is called upon to perform. Furthermore, the complete automatic cycle of operation, coupled with the slow and fast feeding of the tools, materially contributes toward speed of production, as well as accuracy in the work performed.

The safety feature herein described, which causes the driving motor to stop in the event of a decrease in lubricant pressure, presents a decided advancement in the art of machine tool design.

While certain hydraulic control features have been disclosed in this application, it should be understood that these control features per se, including the circuit arrangement and elements thereof such as control valves, pumps, and the like, do not form the subject matter of the present invention. The invention only contemplates such features when used in combination with the other structural arrangements disclosed herein.

While certain specific embodiments of the invention have been disclosed herein, it should be apparent that modifications and changes in structural design may be made without departing from the spirit and scope of the appended claims.

Having thus described the invention, what is claimed as new and desired to secure by Letters Patent is:

1. In a machine tool structure, a hollow rotary tool carrier, a work support extending therein for securing a work piece within the confines of said hollow carrier in a fixed position to be acted upon by tools on said carrier, tool holding means slidably mounted on said carrier and adapted to reciprocate toward and away from a supported work piece, and means for causing said tool holding means to experience variable speed and for causing the positive reciprocation thereof.

2. In a machine tool structure, a hollow rotary tool carrier, a work support extending therein for securing a work piece within the confines of said hollow carrier in a fixed position to be acted upon by tools on said carrier, tool holding means slidably mounted on said carrier and adapted to reciprocate toward and away from a supported work piece, and means for causing said tool holding means to experience a rapid approach movement and a slower movement during the operative functioning of the tool carried thereby.

3. In a machine tool structure, a hollow rotary tool carrier, a work support extending therein for securing a work piece within the confines of said hollow carrier in a fixed position to be acted upon by tools on said carrier, tool holding means slidably mounted on said carrier and adapted to reciprocate toward and away from a supported work piece, and means for causing said tool holding means to experience a rapid approach movement and a slower variable speed during the operative engagement of a tool with the work piece.

4. In a machine tool structure, a hollow rotary tool carrier, a work support for securing a work piece within the confines of said hollow carrier in a fixed position to be acted upon by tools on said carrier, tool holding means slidably mounted on said carrier and adapted to reciprocate toward and away from a supported work piece, and hydraulic actuator means for causing said tool holding means to experience variable speed during the reciprocation thereof.

5. In a machine tool structure, a hollow rotary tool carrier, a work support for securing a work piece within the confines of said hollow carrier in a fixed position to be acted upon by tools on said carrier, a plurality of tool holding slides reciprocable on said carrier toward and away from the axis thereof, hydraulic actuator means for causing the reciprocation of said slides, and valve means for governing the degree of movement of said slides.

6. In a machine tool structure, a hollow rotary tool carrier, a work support extending therein adapted to secure a work piece in a fixed position within said hollow tool carrier, clamping means for securing said work piece on said support, tool holding means reciprocable on said carrier toward and away from a work piece supported therein, and actuating means including mechanism for causing said tool holding means to reciprocate in accordance with a predetermined speed of operation.

7. In a machine tool structure, a rotary tool carrier, a work support for receiving a tube or pipe to be machined, tool holding means slidably mounted on said carrier and adapted to reciprocate toward and away from a supported work piece, clamping means for securing the work piece on the support in position to permit said tool holding means to revolve around said work piece, and power means for automatically causing said tool holding means to reciprocate in a direction toward and away from the center of a supported work piece or pipe and at various speeds, whereby to sever a selected length from said pipe.

8. In a machine tool structure, a hollow rotary tool carrier, an adjustable work support extending therein for securing a work piece within the confines of said hollow carrier in a fixed position to be acted upon by tools on said carrier, tool holding means slidably mounted on said carrier and adapted to reciprocate toward and away from a supported work piece, and means for causing said tool holding means to experience variable speed during the reciprocation thereof.

9. In a machine tool structure, a hollow rotary tool carrier, an adjustable work support extending therein for securing a work piece within the confines of said hollow carrier in a fixed position to be acted upon by tools on said carrier, tool holding means slidably mounted on said carrier and adapted to reciprocate toward and away from a supported work piece, means for causing said tool holding means to experience variable speed during the reciprocation thereof, and means for clamping the work in a fixed position upon the support.

10. In a machine tool structure, a rotary tool carrier, a work support positioned centrally with respect to said carrier and including a fixed member and a carrier adjustably supported by said member for receiving a tubular work piece, means for securing said work piece against rotation within said carrier, tool holding means on said tool carrier adapted to reciprocate toward and away from said work piece, and means for causing the reciprocation of said tool holding means.

11. In a machine tool structure, a rotary tool carrier, a work support extending therein for securing a work piece in position to be acted upon by tools on said carrier, tool holding means slidably mounted on said carrier and adapted to reciprocate toward and away from a supported work piece, means for causing said tool holding means to experience variable speed during the reciprocation thereof, and means for advancing the work piece into position upon said work support.

12. In a machine tool structure, a rotary tool carrier, a work support for securing a work piece in position to be acted upon by tools on said carrier, tool holding means slidably mounted on said carrier and adapted to reciprocate toward and away from a supported work piece, means for causing said tool holding means to reciprocate in a manner to effect the severing of a work piece, and means for receiving the severed section of said work piece and for gripping said work piece during the cutting operation.

13. In a machine tool structure, a rotary tool carrier, a work support extending therein for securing a work piece in a fixed position to be acted upon by a tool on said carrier, tool holding means slidably mounted on said carrier and adapted to reciprocate toward and away from a supported work piece, means for reciprocating said tool holding means, and power operated mechanism for advancing a work piece into position upon said work support.

14. In a machine tool structure, a hollow rotary tool carrier, a plurality of tool holding means slidably mounted upon said carrier and adapted to reciprocate toward and away from the axis thereof, work supporting means for receiving a work part or tube to be machined, said support being positioned within the hollow tool carrier and including clamping means adjacent said tool holding means for securely holding the work against rotation, power actuated means for shifting the work part into a predetermined position for machining, and means for receiving and holding a severed section of said work part.

15. In a machine tool structure, a rotary tool carrier, a work support for securing a work piece in a fixed position to be acted upon by a tool on said carrier, tool holding means slidably mounted on said carrier and adapted to reciprocate toward and away from a supported work piece, chamfering and cut-off means mounted in said work holding means, and means for causing the reciprocation of said tool holding means.

16. In a machine tool structure, a rotary tool carrier, a work support for securing a work piece in a fixed position to be acted upon by a tool on said carrier, tool holding means slidably mounted on said carrier and adapted to reciprocate toward and away from a supported work piece, a tool mounted in said holding means for cutting an internal chamfer in the supported work piece, and means for causing the reciprocation of said work holding means.

17. In a machine tool structure, a rotary tool carrier, a work support for securing a work piece in a fixed position to be acted upon by a tool on said carrier, tool holding means slidably mounted on said carrier and adapted to reciprocate toward and away from a supported work piece, said tool holding means including a main slide and a tool holding member pivotally mounted thereon, a chamfering tool carried by said pivoted member, and means for reciprocating said tool holding means.

18. In a machine tool structure, a rotary tool carrier, a work support for securing a work piece in a fixed position to be acted upon by a tool on said carrier, tool holding means slidably mounted on said carrier and adapted to reciprocate toward and away from a supported work piece, said tool holding means including a main slide and a tool holding member shiftable upon said slide, a chamfering tool mounted in said shiftable member, means for controlling the shifting of the member with respect to the slide to properly direct the tool in cutting a chamfer in the work piece, and means for reciprocating said tool holding means.

19. In a machine tool structure, a rotary tool carrier, a work support for securing a work piece in position to be acted upon by a tool on said carrier, tool holding means slidably mounted on said carrier and adapted to reciprocate toward and away from a supported work piece, power mechanism for imparting rotation to the tool carrier, means for supplying a lubricant to the moving parts in said carrier, and means for preventing the transmission of power to said carrier when the lubricant is not being properly supplied to the moving parts thereof.

20. In a machine tool structure, a main frame, a hollow rotary tool carrier mounted within said frame, a work support for securing a tubular work piece centrally with respect to and within said tool carrier, a plurality of tool holding means radially slidable upon said carrier toward and away from a supported work piece, means for securing said work piece against rotation, hydraulic actuator means coupled with said tool holding means and adapted to effect the simultaneous reciprocation thereof during the rotation of the carrier, and control mechanism for governing the speed and direction of movement of said hydraulic actuators in accordance with a predetermined cycle of movement of the tool holding means whereby, during the initial movement of said tool holding means, a relatively fast travel is experienced toward the work piece, followed by a slower movement when the work is reached, and subsequently followed by a rapid reverse movement upon the completion of the cutting operation, said cycle of operation being fully automatic.

21. In a machine tool structure, a hollow rotary tool carrier, a work support extending therein for securing a work piece within the confines of said hollow carrier in a fixed position to be acted upon by tools on said carrier, tool holding means slidably mounted on said carrier and adapted to reciprocate toward and away from a supported work piece, and means for causing said tool holding means to be progressively fed into a supported work piece whereby to maintain uniformity in the distribution of load on said work piece and for positively moving said tool holding means away from said work piece.

22. In a system of control for machine tools and the like, a work support, a tool support, means for imparting relative movement between said supports, one of said supports being rotatable, driving means for said rotatable support, means for supplying lubricant to the aforementioned parts, and means responsive to variations in lubricant pressure for controlling the operative functioning of said driving means.

23. In a system of control for machine tools and the like, a work support, a tool support, means for imparting relative movement between said supports, one of said supports being rotatable, driving means for said rotatable support, means for supplying lubricant to the aforementioned parts, and means responsive to a decrease in lubricant pressure for controlling the operative functioning of said driving means.

24. In a system of control for machine tools and the like, a work support, a tool support, means for imparting relative movement between said supports, one of said supports being rotatable, driving means for said rotatable support, means for supplying lubricant to the aforementioned parts, and means operable when the lubricant pressure drops to a predetermined point to render the driving means functionally inoperative.

25. In a system of control for machine tools and the like, a work support, a tool support, means for imparting relative movement between said supports, one of said supports being rotatable, driving means for said rotatable support, separately driven means for supplying lubricant to one of aforementioned parts, and means responsive to variations in lubricant pressure for controlling the operative functioning of said driving means.

26. In a system of control for machine tools and the like, a housing, a tool spindle rotatably mounted therein, a prime mover for effecting the rotation of the spindle, a lubricant circulating system for supplying lubricant to one of said aforementioned parts, and a switch operable by the lubricant circulating system for completing and maintaining the electrical circuit and effecting the rotation of the spindle prime mover.

27. In a system of control for machine tools and the like, a housing, bearings supported by said housing, a tool spindle rotatably mounted in said bearings, a lubricant circulating system including a prime mover for supplying lubricant to one of said aforementioned parts, a second prime mover for effecting the rotation of the spindle, an electrical circuit for maintaining the operation of the spindle prime mover, an electrical circuit for the lubrication circulating system prime mover, and means connecting said prime mover circuits whereby the completion of the lubricant circulating system prime mover circuit effects the completion of the spindle prime mover electrical circuit.

28. In a machine tool, a housing, bearings supported by said housing, a tool spindle rotatably mounted in said bearings, a reservoir to supply oil, a pump to pump said oil, piping connecting the pump to the bearings, a prime mover connected to drive the pump, a separate prime mover constituting an electric motor connected to drive the tool spindle, an automatic pressure switch controlling the operation of the motor energizing the motor when it is closed and cutting out the motor when it is opened, a pressure responsive mechanism in series in the piping so that oil must flow in the piping before it can move and conversely it must move before it is flowing in the piping, and a mechanical connection between the pressure responsive mechanism and the pressure switch to close the switch when oil is flowing and open it when the oil stops flowing, whereby to insure a proper supply of oil to the bearings both when the spindle starts and while it is running.

PAUL R. GUIRL.
W. F. & JOHN BARNES COMPANY,
*Assignee.*

By WM. W. BARTON,
*President.*